United States Patent Office 2,854,491
Patented Sept. 30, 1958

2,854,491
CHLORINOLYSIS OF CYCLIC ORGANIC COMPOUNDS

Frederick E. Kung, Akron, Ohio, assignor to Columbia-Southern Chemical Corporation, Allegheny County, Pa., a corporation of Delaware No Drawing. Application January 4, 1955
Serial No. 479,848

13 Claims. (Cl. 260—660)

The present invention relates to the manufacture of chlorinated aliphatic hydrocarbons from cyclic organic compounds. More particularly, it concerns the chlorinolysis of cyclic organic compounds, notably among which are the benzenes and naphthalenes, with the consequent production of chlorinated aliphatic hydrocarbons such as carbon tetrachloride.

According to this invention, the ring structure of the cyclic organic compound is ruptured and chlorinated. This results in the preparation of valuable chlorinated aliphatic hydrocarbons. Thus, by virtue of the present invention, inexpensive cyclic organics such as hexachlorobenzene, the waste isomers of hexachlorocyclohexane and the crude mixtures of naphthalenes and alkylated naphthalenes constitute starting materials in the preparation of chlorinated aliphatics.

Since preparation of hexachlorocyclohexane by procedures described in the literature results in an isomeric mixture with up to 90 percent of the mixture being other than the insecticidally active gamma isomer, the present invention provides an outlet for these waste isomers which otherwise would be of little or no value. Also, hexachlorobenzene which is encountered as a waste product of various high temperature organic chlorinations, such as propane chlorination, may be transformed into commercially more valuable materials. Commercial mixtures of alkylated naphthalenes, one of the cheaper sources of cyclic compounds, are also susceptible of use herein.

Another advantage afforded by this invention is a reduction in by-product hydrogen chloride. Propane, for example, may be chlorinated to provide carbon tetrachloride but for each mole thereof, some 2⅔ moles of hydrogen chloride can be expected. On the other hand, by subjecting hexachlorobenzene to chlorinolysis essentially no hydrogen chloride is necessarily produced. Other cyclic organics having a lower hydrogen to carbon ratio than propane likewise may be used to manufacture carbon tetrachloride with formation of less by-product hydrogen chloride than in the propane chlorination.

The instant invention may be practiced by recourse to various procedures. Thus, chlorinolysis of a cyclic organic such as hexachlorobenzene may be conducted in the liquid phase as well as in the vapor phase. Although not essential, catalysts may be employed either to increase the rate of reaction or to permit recourse to less rigorous conditions in comparison with those utilized in connection with a non-catalytic chlorinolysis.

According to one embodiment of the instant invention, chlorinolysis of a cyclic compound such as hexachlorobenzene is conducted in a liquid mixture of hexachlorobenzene and chlorine at elevated temperatures and preferably with recourse to superatmospheric pressures. In the absence of a catalyst, temperatures above about 400° C. which admit of a liquid phase, such as up to the critical temperature of the hexachlorobenzene are employed. Preferably, a range of about 425° C. to about 550° C. are employed, although higher temperatures, such as 800° C. may be used. At least sufficient pressure is employed to insure a liquid phase with superatmospheric pressures ranging from about 20 atmospheres up to about 100 atmospheres generally sufficing. Of course, even higher pressures are possible, but the added construction cost mitigates against substantially higher pressures. Pressures below 20 atmospheres, e. g. from 4 to 10 atmospheres, may be employed.

In practice, elemental chlorine as a gas or liquid and hexachlorobenzene or other contemplated cyclic organics are introduced into a reaction zone to provide a liquid mixture thereof. This liquid body of hexachlorobenzene and chlorine is maintained at an elevated temperature in excess of 400° C., more notably between 425° C. and 800° C. for at least several minutes. Chlorinolysis occurs, e. g. the hexachlorobenzene ring is ruptured and the valences of the carbon atoms of the resulting aliphatic chains are at least partially, and more usually fully chlorinated. Notably, carbon tetrachloride is formed.

For example, hexachlorobenzene may be charged to a reactor capable of withstanding moderately high superatmospheric pressures. Elemental chlorine, or a compound capable of functioning in the manner of elemental chlorine as a chlorinating agent under the reaction conditions, is also introduced to the reactor along with the hexachlorobenzene. With the reactor completely sealed, the temperature is then raised to at least about 400° C. Sufficient hexachlorobenzene and chlorine are charged so that a liquid mixture thereof is present under the reaction conditions. After maintaining the contents of the reaction at the above enumerated conditions, generally for at least about an hour, carbon tetrachloride will be prepared. More extended reaction periods up to about 20 hours often provide higher conversions. Shorter periods are operative but conversations are lower. Periods of less than 30 minutes, e. g. about 10 minutes have been employed. Even reaction times of from 1 to 5 minutes or less may be employed.

By providing the reactor with a suitable vapor removal means, a continuous process may be conducted while still observing the conditions otherwise provided in a batch-type operation. Thus, after initiating the reaction in the manner described in connection with the batch operation, additional quantities of hexachlorobenzene or like cyclic organic and elemental chlorine or chlorine yielding compound may be continuously or intermittently added to the reaction vessel. The rate of addition of the respective reactants is correlated with the materials which are removed as a vapor from the reaction system in order to maintain a steady or substantially steady state. If desired, the take off gases may be resolved into their components and the unreacted contents thereof may be recycled to the reaction vessel along with the additional quantities which comprise the make up.

It has further been found in connection with such liquid phase reaction that the presence of a large excess of cylic organic, e. g. hexachlorobenzene, or chlorine in the reaction vessel facilitates the reaction. That is, under otherwise similar reaction conditions, the presence of a liquid body containing hexachlorobenzene or like cyclic organic and elemental chlorine which occupies in excess of half the volume of the reactor provides enhanced reaction rates, for example, in comparison with the same system which has a liquid body filling less than half the volume of the reactor, as for example, but one-fourth the volume.

Besides carbon tetrachloride, various other chlorinated aliphatic hydrocarbons, notably chlorinated lower aliphatic hydrocarbons of from 1 to 4 carbon atoms chain length may be provided. For example, perchloroethylene and hexachloroethane are also produced. Carbon-chlorides (perchlorinated hydrocarbons) containing 1 or 2 carbon atoms are usually the major products, e. g. carbon tetrachloride and hexachloroethane.

The following examples illustrate the present invention:

EXAMPLE I

The reaction vessel in the following series of experiments consisted of Carius tubes made from heavy-wall Pyrex glass tubing 73 centimeters in length, one end being closed. The inner diameter of the tube was 0.8 centimeter for the first 60 centimeters adjacent the closed end. The other 13 centimeters had an internal diameter of 0.2 centimeter. This tube had a volume of about 30 cubic centimeters. Prior to using, the tube was carefully annealed in a furnace at 585° C.

Into the larger diameter portion of this tube was introduced the quantity of hexachlorobenzene listed in the hereinafter included tables. Thereafter, the appropriate quantity of gaseous chlorine was flowed through a chlorine measuring device and thence into the tube. Then, the narrow end was sealed and the tube was placed in a 28.5 inch length of ¾ inch iron pipe capped at both ends.

These charged tubes were heated in an electric furnace thermostatically controlled for the desired temperature as listed in the below table for the total length of time indicated. The pressure in the tubes under this condition exceeded atmospheric. At the conclusion of the period in the furnace, the pipe was withdrawn and the tube removed from the pipe while still hot. Thereafter, the tube was allowed to cool to room temperature and then cooled in a Dry Ice acetone bath. Thereafter, the tube was opened and the contents warmed gently to room temperature to drive off any remaining chlorine. Finally, the contents were dissolved in carbon disulfide to a given volume and subjected to infra-red analysis.

The following table is the specific reaction conditions and results.

Table I

| Millimoles Charged | | Temperature, °C. | Time (Hrs.) | Total Yield $CCl_4$ (millimoles) | Notes |
|---|---|---|---|---|---|
| $C_6Cl_6$ | $Cl_2$ | | | | |
| 1.0 | 22 | 450 | 16 | 2.5 | 1 |
| 1.0 | 22 | 500 | 16 | 4.5 | 1 |
| 1.0 | 22 | 500 | 4 | 3.8 | 1 |
| 1.0 | 22 | 500 | 1 | 1.2 | 2 |
| 1.0 | 22 | 540 | 16 | 4.9 | ---- |
| 1.0 | 22 | 540 | 4 | 4.3 | 1 |
| 1.0 | 22 | 540 | 1 | 3.3 | 1 |
| 0.5 | 11 | 500 | 4 | 1.32 | 2 |
| 2.0 | 44 | 500 | 1 | 4.0 | 2 |
| 1.9 | 46 | 500 | 0.5 | 1.7 | ---- |
| 1.9 | 22.7 | 500 | 0.5 | 1.8 | ---- |
| 1.22 | 11 | 500 | 16 | 5.4 | 2 |
| 1.93 | 12.9 | 500 | 67 | 7.85 | 1 |
| 1.89 | 13.0 | 500 | 16 | 8.2 | ---- |
| 1.89 | 12.9 | 500 | 4 | 5.6 | 3 |
| 1.9 | 12.4 | 500 | 1 | 2.2 | ---- |
| 1.89 | 12.6 | 500 | 0.5 | 1.45 | 3 |
| 5.2 | 14.0 | 500 | 1 | 5.7 | ---- |
| 22.3 | 24.4 | 500 | 0.5 | 5.7 | ---- |
| 1.93 | 13.4 | *600 | 1 | 7.1 | ---- |
| 1.92 | 12.7 | *700 | 1 | 7.1 | ---- |
| 1.86 | 12.9 | 500 | 1 | 3.6 | ---- |
| 22.8 | 23.2 | 500 | 0.5 | 5.2 | ---- |
| 37.0 | 23.6 | 500 | 0.5 | 10.4 | ---- |
| 37.0 | 23.0 | 500 | 0.17 | 0.8 | ---- |

Notes:
1. Products also included hexachloroethane.
2. Products also included perchloroethylene.
3. Products also included hexachloroethane and perchloroethylene.
*Tubes here were made of quartz glass.

EXAMPLE II

The reactor was a Carius tube made from heavy-wall Pyrex glass tubing, and had an overall length of 39.5 centimeters. Initially, one end was closed and the other left open for the introduction of the reagents. Adjacent the closed end, the internal diameter was 1.4 centimeters for a length of about 19.5 centimeters and the balance of the tube had an internal diameter of 0.55 to 0.6 centimeter. In the middle of the narrower portion of the tube a constricted portion was provided which had an internal diameter of 0.25 to 0.3 centimeters. The volume of the tube was about 30 cubic centimeters.

Hexachlorobenzene and chlorine were then sequentially placed in the tube whereafter the tube was closed by heating and melting the glass at the open end. The sealed tubes were then heated to 450° C. in the manner described in connection with Example I.

At the conclusion of the reaction period, the tubes were cooled to room temperature, and further cooled in Dry Ice and opened. The contents were analyzed for unreacted chlorine by liberating iodine from potassium iodide. By difference, the reacted chlorine was determined and carbon tetrachloride yield calculated.

Table II records the conditions and results of the various runs in accordance with the above-described procedure:

Table II

| Millimoles charged | | Time (Hrs.) | Total Yield $CCl_4$ (millimoles) |
|---|---|---|---|
| $C_6Cl_6$ | $Cl_2$ | | |
| 36.7 | 22.9 | 6 | 12.7 |
| 36.8 | 23.1 | 4 | 9.9 |
| 36.6 | 23.2 | 3 | 8.0 |
| 37.0 | 23.3 | 2 | 6.8 |
| 37.0 | 24.1 | 1 | 3.1 |
| 37.4 | 22.2 | 0.5 | 1.2 |
| 37.0 | 46.5 | 2 | 8.8 |
| 37.0 | 23.9 | 2 | 5.4 |
| 36.7 | 14.4 | 2 | 2.9 |
| 71.6 | 22.9 | 2 | 9.1 |
| 18.8 | 23.1 | 2 | 3.2 |
| 10.7 | 23.2 | 4 | 3.55 |
| 2.59 | 23.3 | 16 | 4.03 |
| 1.97 | 24.4 | 6 | 0.19 |
| 1.0 | 23.8 | 6 | 0.17 |
| 71.8 | 45.5 | 2 | 14.6 |

Liquid phase reaction of cyclic organics with chlorine to produce aliphatic chlorinated hydrocarbons such as carbon tetrachloride is facilitated by the inclusion of appropriate catalytic agent. Catalysts apparently increase the rate of reaction, and with conditions otherwise the same, provide larger quantities of product per unit time. Also, catalysts permit operation at temperatures lower than those of a non-catalytic process. Thus, in the presence of a catalyst such as aluminum chloride, the chlorinolysis takes place at temperatures as low as about 130° C. or possibly 100° C. In catalyzed procedures, those temperatures between about 200° C. and 500° C. are frequently employed. Also, catalysts may permit the reaction to be conducted at lower pressures, e. g. atmospheric pressure or below those usually utilized in a non-catalytic operation.

Catalytic activity is observed with various materials used in varying concentrations. Catalysis is obtained by incorporating only a minor amount of the catalyst in the liquid phase, e. g. at least about 0.05 percent catalyst by weight of the cyclic organic compound. Mainly, larger catalyst concentrations, even to the extent where the catalyst predominates in the liquid reaction body, are used; thus, 50 percent and higher concentrations of catalyst have been successfully utilized.

Compounds classified as Lewis acids, including the Freidel-Crafts catalysts, may be employed as catalysts. Typical compounds which have demonstrated catalytic activity include bismuth trichloride, antimony trichloride, zinc chloride, nickel chloride, arsenic trichloride and stannic chloride. Considerably more effective catalysts include ferric chloride, aluminum chloride and sulfuric acid. Sulfuric acid is, however, not particularly recommended due to undesirable side reactions forming phosgene and hydrogen chloride which accompany its use. Because of their excellent catalytic activity, ferric chloride and aluminum chloride comprise a most preferred pair of Freidel-Crafts catalysts.

Besides these Lewis acid type catalyst, other catalysts of the so called heterogeneous type are suitable. Illustrative catalysts of the character include barium chloride, sodium sulfate and the like. One of the more effective heterogeneous catalysts is provided by depositing sodium sulfate on a carbon carrier.

The following example illustrates the effect of various catalytic agents:

EXAMPLE III

Following the procedure and apparatus described in Example II, except that the quantity of catalyst listed in Table III was also charged to the Carius tube, a series of experiments were conducted at 450° C. demonstrating the catalytic effect of Lewis acids in the reaction medium.

After the desired reaction period, the tube was cooled in a Dry-Ice bath and opened. Thereafter, it was attached to a trap in liquid nitrogen, the pressure reduced to 3 millimeters mercury and the contents allowed to reach room temperature. Chlorine and carbon tetrachloride condensed in the trap which was thereafter warmed to room temperature, boiling off the chlorine. After adding water and sodium sulfite to remove any possible remaining chlorine, the organics were dissolved in a known volume of carbon disulfide and analyzed by infra-red spectrometry.

Table III gives the collected data as well as the particular reaction conditions of the individual runs:

*Table III*

| Catalyst | Millimoles Charged | | | Time (Hrs.) | Total Yield CCl$_4$ (millimoles) |
| --- | --- | --- | --- | --- | --- |
| | Catalyst | C$_6$Cl$_6$ | Cl$_2$ | | |
| 96% H$_2$SO$_4$ | 2.0 | 10.6 | 24.5 | 2 | 7.9 |
| 20% SO$_3$ | 2.2 | 10.6 | 23.2 | 2 | 8.1 |
| 20% SO$_3$ | 1.9 | 2.55 | 24.0 | 2 | 6.0 |
| BiCl$_3$ | 4.1 | 10.4 | 23.5 | 2 | 4.3 |
| SbCl$_3$ | 3.5 | 10.6 | 24.8 | 2 | 3.9 |
| ZnCl$_2$ | 9.3 | 10.6 | 23.7 | 2 | 3.4 |
| NiCl$_2$ | 3.8 | 10.7 | 23.6 | 2 | 3.4 |
| AsCl$_3$ | 6.1 | 10.6 | 23.4 | 2 | 3.1 |
| SnCl$_4$ | 8.7 | 10.5 | 21.8 | 2 | 3.0 |
| BF$^3$ | 3.0 | 10.4 | 23.4 | 2 | 1.9 |

As indicated, the liquid phase process may be conducted in the presence of substantial quantities of a suitable catalyst, even to the extent that the catalyst comprises a major portion of the reaction medium. In one embodiment, chlorinolysis of a cyclic compound such as hexachlorobenzene or like cyclic may be effected by introducing elemental chlorine and hexachlorobenzene into a molten body of the catalyst. For example, gaseous chlorine and liquid hexachlorobenzene may be introduced beneath the liquid level of a pool of molten ferric chloride maintained at a temperature of about 300° C. In such procedure, chlorinolysis occurs within the molten body with the reaction product vaporizing and being recovered from the vapors emanating from the molten pool.

The following experiments were conducted to demonstrate varying the proportions of catalysts:

EXAMPLE IV

Following the procedure of Example II using ferric chloride in the amounts listed in Table IV, hexachlorobenzene and chlorine were reacted to form as their major product carbon tetrachloride:

*Table IV.—Ferric chloride catalysts*

| Millimoles Charged | | | Temperature, °C. | Time (Hrs.) | Rate of CCl$_4$ formation, Millimoles per hour |
| --- | --- | --- | --- | --- | --- |
| Catalyst | C$_6$Cl$_6$ | Cl$_2$ | | | |
| 2.8 | 10.7 | 23.2 | 450 | 2.0 | 4.0 |
| 18.5 | 10.5 | 23.0 | 400 | 0.5 | 23.0 |
| 18.5 | 10.5 | 23.0 | 350 | 1.0 | 11.3 |
| 18.5 | 3.1 | 23.0 | 300 | 2.0 | 6.4 |
| 18.5 | 10.5 | 23.0 | 300 | 2.0 | 3.8 |
| 18.5 | 21.0 | 23.0 | 300 | 4.0 | 1.4 |
| 37.0 | 10.5 | 23.0 | 300 | 2.0 | 7.5 |
| 37.0 | 21.0 | 23.0 | 300 | 2.0 | 4.3 |
| 9.2 | 5.2 | 23.0 | 300 | 2.0 | 2.8 |
| 18.5 | 10.5 | 12.0 | 300 | 2.0 | 2.0 |
| 18.5 | 10.5 | 46.0 | 300 | 2.0 | 6.4 |

EXAMPLE V

An open nickel bomb, capacity 100 cubic centimeters, was charged with 10 grams of hexachlorobenzene (0.035 mole) and 10 grams of ferric chloride, whereafter it was closed, valved and cooled in a Dry-Ice-acetone bath. Via the valve, three cubic centimeters (0.069 mole) of liquid chlorine were evaporated into the bomb and recondensed therein. The bomb was then closed and removed from the cooling bath. A pressure gauge was connected to the valve.

Thusly charged, the bomb was heated for two hours in horizontal position until the temperature reached about 390° C., and then maintained at 390° C. for two hours. A maximum pressure of 345 pounds per square inch gauge was employed. At the end of the heating, the bomb was gradually cooled, finally being chilled with Dry Ice-acetone mixture. After disconnecting the valve, the volatile contents of the bomb were withdrawn and condensed in a liquid nitrogen-cooled container by vacuum pumping to a pressure of 2–3 millimeters mercury. The container was withdrawn from contact with the liquid nitrogen and chlorine volatilized into the atmosphere. Water and sodium sulfite were added to remove any chlorine traces.

From this water mixture, the chlorinated aliphatic hydrocarbons, notably carbon tetrachloride, were extracted with carbon disulfide. Infra-red analysis showed 0.027 mole of carbon tetrachloride was produced.

EXAMPLE VI

Following the procedure of Example II, aluminum chloride was employed to catalyze the reaction. Table V gives the pertinent data:

*Table V.—Aluminum chloride catalysis*

| Millimoles Charged | | | Temperature, °C. | Time (hours) | Rate of CCl$_4$ formation, Millimoles per hour |
| --- | --- | --- | --- | --- | --- |
| Catalyst | C$_6$Cl$_6$ | Cl$_2$ | | | |
| 15 | 7 | 7 | 130 | 42 | [1] 0.03 |
| 45 | 10.5 | 1 | 200 | 16 | 0.75 |
| 45 | 10.5 | 23.0 | 230 | 4 | 2.2 |
| 45 | 10.5 | 1 | 230 | 4 | 2.2 |
| 45 | 3.1 | 1 | 230 | 3 | 1.8 |
| 45 | 21.0 | 1 | 230 | 3 | 2.2 |
| 22.5 | 21.0 | 1 | 230 | 3 | 1.3 |
| 11.2 | 5.25 | 1 | 230 | 6 | 1.0 |
| 22.5 | 10.5 | 1 | 230 | 4 | [2] 2.3 |
| 22.5 | 10.5 | 1 | 230 | 18 | [3] 1.2 |
| 22.5 | 10.5 | 23.0 | 300 | 2 | 3.3 |
| 22.5 | 3.1 | 23.0 | 300 | 2 | 2.9 |
| 22.5 | 21.0 | 1 | 300 | 1 | 3.3 |
| 22.5 | 3.1 | 1 | 300 | 2 | 2.9 |
| 7.5 | 21.0 | 1 | 400 | ⅔ | 6.6 |
| 15.0 | 21.0 | 1 | 400 | ½ | 11.5 |
| 22.5 | 21.0 | 1 | 400 | ½ | 15.6 |
| 5.1 | 10.6 | 23.4 | 450 | 1 | 6.8 |
| 7.6 | 37.0 | 23.0 | 450 | 1 | 13.9 |

[1] Hexachloroethane only produced.
[2] Tube rotated while heating.
[3] A 50–50 mole percent mixture of hexachloroethane and carbon tetrachloride.

From Examples IV and VI, it will be noted that by recourse to catalyst reaction temperatures substantially lower than those utilized in non-catalytic liquid reactions are effective. Also, lower reaction temperatures apparently favor the preparation of hexachloroethane, see Table V.

The following example demonstrates the use of heterogeneous type catalysts.

EXAMPLE VII

Following the procedure outlined in Example II, but including the given amount of sodium sulfate or barium chloride, these results were obtained for a one hour time period at 450° C. in the furnace.

*Table VI.—Catalysis*

| Catalyst—(grams) | | $C_6Cl_6$ | $Cl_2$ | $CCl_4$ prepared (millimoles) |
|---|---|---|---|---|
| $Na_2SO_4$ | 2.64 | 10.5 | 23.2 | 5.8 |
| $Na_2SO_4$ | 4.47 | 2.53 | 24.0 | 1.9 |
| $BaCl_2$ | 2.6 | 10.4 | 23.0 | 1.6 |

Cyclic organics contemplated herein may be converted to aliphatic chlorinated hydrocarbons such as carbon tetrachloride in the vapor phase by subjecting a gaseous mixture containing chlorine and cyclic organic such as hexachlorobenzene to temperatures on the order of 400° C. to 1200° C., and even higher. The mixture is maintained at these elevated temperatures for several seconds, e. g. between 3 and 10 seconds, although it will be appreciated that even lower time periods such as one second or with prolonged periods of 30 minutes or longer provide chlorinolysis and conversion of the hexachlorobenzene to carbon tetrachloride or other aliphatic chlorinated hydrocarbons.

The following example demonstrates the gas phase reaction.

EXAMPLE VIII

In a period of 36 minutes, a total of 9.7 grams of hexachlorobenzene and 85 grams of chlorine was passed through a Sillimanite tube 12 inches long of one inch internal diameter. The chlorine and hexachlorobenzene were preheated to about 240°–250° C. The tube was anchored in an electric furnace at a temperature of from 1100° C. to 1177° C.

Analysis of the reaction product showed a 12 percent yield of carbon tetrachloride and an 18 percent yield of perchloroethylene by weight based on the consumed hexachlorobenzene.

Although the invention has so far been described with particular reference to hexachlorobenzene as the cyclic organic subjected to chlorinolysis, this has been primarily for convenience and it is to be appreciateed that cyclic organics generally are contemplated. Monocyclic and polycyclic organics, and especially carbocyclic compounds are susceptible of use herein.

Monocarbocyclic compounds, and particularly the benzenes are included. Thus, benzene, its addition and substitution chlorination products such as monochlorobenzene, the dichlorobenzenes, the trichlorobenzenes, the more fully chlorinated benzenes, including hexachlorobenzene, and additive chlorination products of benzene, foremost of which for economical reasons are the insecticidally inactive isomers of hexachlorocyclobenzene (all but the gamma isomer), are converted to carbon tetrachloride or like chlorinated hydrocarbon. Decachlorocyclohexane and dodecachlorocyclohexane as well as other chlorination products of hexachlorocyclohexane are useful. Aralkyls such as the alkyl benzenes, particularly the lower alkyl benzenes such as the toluenes, the xylenes as well as other monoalkyl and polyalkylbenzenes, for example, pseudocumene, isodurene, ethyl benzene, propyl benzene, etc., and their additive and substitution chlorination products are useful.

Still other monocarbocyclics include the monohydroxybenzenes, e. g. phenols like pentachlorophenol, phenol, the cresols, etc.; polyhydroxyphenols as catechol, resorcinol, pyrogallol, etc.; phthalic anhydride or phthalic acid as well as the chlorinated phthalates typified by tetrachlorophenol; nitrobenzenes such as mononitrobenzene, the dinitrobenzenes, etc. and chlorinated nitrobenzenes, for example, 3,4-dichloronitrobenzene.

Polycyclic compounds which may be treated according to this invention include the diphenyls, among which are diphenyl itself, the chlorinated diphenyls, benzophenone, and their lower alkyl substituted compounds. Naphthalene, naphthols, and the various alkylated naphthalenes, especially the lower mono- and poly-alkylated naphthalenes such as are commercially sold as mixtures thereof under various trade names are especially suitable. The other polycyclic organics formed in coal and coal tar such as indene, phenanthrene, anthracene, pyrene and chrysene are suitable. Chlorinolysis as herein contemplated may, in fact, be practiced directly with powdered coal or other crudes containing a substantial proportion of the cyclic compounds.

Besides the carbocyclic compounds, heterocyclics containing a preponderance of carbon atoms in the ring structure, usually at least 4 carbon atoms, can be utilized. For example, o-phenanthroline has been converted to carbon tetrachloride. It will be appreciated that other heterocyclics are useful such as pyridine, alpha-picoline, beta-picoline, quinoline, indole, acridine, thiophene, pyrrole, furan, and like heterocyclics.

The particular cyclic compound selected for practice of the invention will frequently be different, depending on the then controlling factor. If reagent cost controls, then the cheapest cyclics or mixtures containing large percentages of cyclics are preferred. When minimized hydrogen chloride is the dominant element, those cyclics having the lowest hydrogen to carbon atom ratio are chosen. Often, a combination of both factors govern. Cyclics having a hydrogen to carbon ratio of less than 8 to 3, the ratio in propane, are preferred other considerations being equal.

The following examples demonstrate the chlorinolysis of waste isomers of hexachlorocyclohexane to chlorinated aliphatic hydrocarbons according to the present invention:

EXAMPLE IX

Following the procedure of Example II, 0.542 gram of the alpha and beta waste isomers of hexachlorocyclohexane, 2.02 grams of chlorine and 1.04 grams of ferric chloride were charged to a Carius tube of the type described in Example II, placed in an iron pipe and heated in the furnace to a temperature of 450° C. in 50 minutes and kept at 450° C. for two hours. Analysis of the contents of the tube by the procedure described in Example III revealed the presence of 7.7 millimoles of carbon tetrachloride.

EXAMPLE X

Following the procedure of, and using the apparatus of Example V, except that 1.12 grams (0.0038 mole) of hexachlorocyclohexane (essentially all alpha and beta isomer) were employed in lieu of hexachlorobenzene provided 0.0038 mole of carbon tetrachloride, and smaller quantities of hexachloroethane. A maximum pressure of 580 pounds per square inch gauge was used.

Experiments in which various illustrative cyclic compounds were subjected to chlorinolysis with consequent carbon tetrachloride formation are as follows:

EXAMPLE XI

With the apparatus and procedure of Example II, chlorinolysis at 500° C. of the listed cyclics to carbon tetrachloride was performed. Where catalyst is indicated in Table VII, ferric chlorides were used.

Table VII

| Cyclic Compound | Charged millimoles | | | Time (hours) | Yield CCl₄ (grams) |
|---|---|---|---|---|---|
| | Cyclic | Chlorine | Catalyst | | |
| Naphthalene | 0.88 | 28.0 | | 16 | 1.17 |
| Mixed Alkylated Naphthalenes[a] | [b]0.118 | 29.0 | | 18 | 1.1 |
| Tetrachlorophthalic anhydride | 1.86 | 28.0 | | 16 | 1.59 |
| Pentachlorophenol | 1.93 | 29.5 | | 16 | 1.39 |
| 3,4-dichloronitro-benzene | 1.61 | 28.8 | | 16 | 0.96 |
| Diphenyl | 0.74 | 29.5 | | 16 | 0.65 |
| Do | 0.75 | 29.0 | 18.5 | 4 | 1.1 |
| o-phenanthroline hydrate | 0.59 | 28.5 | | 16 | 0.54 |
| Do | 0.57 | 29.0 | 18.5 | 18 | 0.75 |

[a] A commercial mixture primarily of alkylated naphthalenes sold under the trade name of Exosol.
[b] In grams.

Further, it will be appreciated that the cyclic organic material need not be in purified form, but may constitute mixtures of cyclics even as they are found in nature. Thus, coal which is primarily composed of cyclic constituents, usually in the form of condensed benzene rings may be employed as hereinafter demonstrated:

EXAMPLE XII

With the procedure and apparatus of Example II, 0.12 gram of Bruceton coal, 0.022 mole of aluminum chloride and 0.029 mole of chlorine were charged to the Carius tube, which was then rotated at the rate of 40 revolutions per minute in an oven and heated 17 hours at 200° C., 4 hours at 300° C. and 12 hours at 400° C. Some 0.57 gram of carbon tetrachloride was recovered as product.

EXAMPLE XIII

Paralleling Example XII, but employing 0.037 mole of ferric chloride in lieu of aluminum chloride and heating for 17 hours at 300° C. and 5 hours at 500° C. yielded 0.8 gram of carbon tetrachloride.

From the foregoing, it is clear chlorinolysis of monocyclic and polycyclic organic compounds is successfully achieved. In this connection, the chlorinolysis of monocyclic compounds, for example, six-carbon membered carbocyclics, requires the more vigorous chlorinolysis conditions. Thus, chlorinolysis of carbocyclics typified by the benzenes such as hexachlorobenzene and hexachlorocyclohexane proceeds with the least ease.

On the other hand, with many polycyclic organic compounds, rupture of one or more, but not all of the rings thereof, may occur with comparative ease. Except insofar as this rupture of less than all the rings is an intermediate step or condition, the present invention is directed to a process in which the entire ring structure is ruptured. Thus, with naphthalene as an example, it is possible to rupture but one of the rings as an intermediate step to obtain a chlorinated benzene and chlorinated hydrocarbons. In accordance with the present invention, at least a portion of the chlorinated benzene or other monocyclic intermediate compound is also ruptured either by chlorinolysis of the separated cyclic intermediate or by continued chlorinolysis, usually under more rigorous conditions of the mixture containing the intermediate.

Expressed otherwise, the overall chlorinolysis ruptures at least two ring linkages in each ring of the cyclic compound; that is, in the instance of a polycyclic such as naphthalene conversion of both rings to chlorinated aliphatic hydrocarbon, either in a single procedure step or sequentially, is encompassed.

The amount of chlorine consumed in the chlorinolysis can at least be roughly determined by stoichiometry. Thus, by way of illustration, the chlorinolysis of hexachlorobenzene to carbon tetrachloride will consume nine moles of chlorine per mole of hexachlorobenzene:

$$C_6Cl_6 + 9Cl_2 \rightarrow 6CCl_4$$

With other cyclics and products, these stoichiometric principles may also be applied.

Other chlorine containing materials which act in the manner of chlorine under the reaction conditions may be used in lieu of or to supplement the chlorine requirements. Thus, dodecachlorocyclohexane, which under the contemplated temperatures dissociates into chlorine and hexachlorocyclohexane may itself, act as a partial chlorinolysis agent. Ferric chloride, besides exerting a catalytic effect may also be used in lieu of chlorine.

Although the present invention has been described with reference to particular details of specific embodiments, it is not intended that the invention be construed as limited thereto except insofar as the appended claims are concerned.

I claim:

1. The method of manufacturing a chlorinated aliphatic hydrocarbon by chlorinolysis of a cyclic compound which comprises subjecting a cyclic organic compound containing a ring having at least 5 ring atoms, a preponderance of and at least 4 ring carbon atoms, and at least one of said ring carbon atoms being linked only to replaceable substitutents which permits the formation from such ring carbon atoms of chlorinated aliphatic hydrocarbons during chlorinolysis, and chlorine to a superatmospheric pressure of at least 4 atmospheres and a temperature in excess of about 100° C. in the presence of a catalytic concentration of a chlorinolysis catalyst, rupturing at least two ring linkages in each ring of the cyclic compound and obtaining a chlorinated aliphatic hydrocarbon.

2. The method of manufacturing an aliphatic chlorinated hydrocarbon by chlorinolysis of a cyclic organic compound containing a six-carbon ring and at least one of said ring carbon atoms being linked only to replaceable substituents which permits the formation from such ring carbon atoms of chlorinated aliphatic hydrocarbons during chlorinolysis, which comprises subjecting a mixture of said cyclic compound and chlorine to a superatmospheric pressure of at least 4 atmospheres and a temperature in excess of about 100° C. in the presence of a catalytic concentration of a chlorinalysis catalyst, rupturing at least two ring linkages per ring of the cyclic compound and recovering an aliphatic chlorinated hydrocarbon.

3. The process of claim 2 wherein the cyclic organic compound is hexachlorocyclohexane.

4. The process of claim 2 wherein the cyclic organic compound is hexachlorobenzene.

5. The process of claim 2 wherein the cyclic compound is a naphthalene.

6. The method of manufacturing a chlorinated aliphatic hydrocarbon by chlorinolysis of a cyclic organic compound containing a ring having at least 5 ring atoms, a preponderance of and at least 4 ring carbon atoms, and at least one of said ring carbon atoms being linked only to replaceable substituents which permits the formation from such ring carbon atoms of chlorinated aliphatic hydrocarbons during chlorinolysis, which comprises subjecting a liquid mixture of said compound and chlorine containing a catalytic concentration of a chlorinalysis catalyst to a temperature in excess of 100° C. and a superatmospheric pressure of at least 4 atmospheres rupturing at least two ring linkages in each ring of the cyclic compound and obtaining a chlorinated aliphatic hydrocarbon.

7. The method of manufacturing a chlorinated aliphatic hydrocarbon by chlorinolysis of a cyclic organic compound containing a six-carbon ring and at least one of said ring carbon atoms being linked only to replaceable substituents which permits the formation from such ring carbon atoms of chlorinated aliphatic hydrocarbons during chlorinolysis, which comprises subjecting a liquid mixture of the cyclic compound and chlorine including a catalytic concentration of a chlorinolysis catalyst, to a temperature in excess of 100° C. and superatmospheric pressure of at least 4 atmospheres rupturing at least two ring linkages in each ring of the cyclic compound and recovering a chlorinated aliphatic hydrocarbon.

8. The method of claim 7 wherein the superatmospheric pressure is at least 20 atmospheres.

9. The method of claim 7 wherein the temperature is from 425° to 550° C.

10. The method of manufacturing carbon tetrachloride by chlorinolysis of hexachlorobenzene which comprises subjecting a liquid mixture of hexachlorobenzene and chlorine including a catalytic concentration of a chlorinolysis catalyst to a temperature in excess of 100° C. and superatmospheric pressure of at least 4 atmospheres, rupturing the ring and obtaining carbon tetrachloride.

11. The method of manufacturing a chlorinated aliphatic hydrocarbon by chlorinolysis of hexachlorocyclohexane which comprises subjecting a liquid mixture of hexachlorocyclohexane and chlorine containing a catalytic concentration of a chlorinolysis catalyst to a temperature in excess of 100° C. and superatmospheric pressure of at least 4 atmospheres and rupturing the ring whereby a chlorinated aliphatic hydrocarbon is obtained.

12. The method of claim 1 wherein the catalyst is ferric chloride.

13. The method of claim 1 wherein the catalyst is aluminum chloride.

14. The method of preparing carbon tetrachloride which comprises subjecting chlorine and a cyclic organic compound containing a six-carbon ring and at least one of said ring carbon atoms being linked only to replaceable substituents which permits the formation from such ring carbon atoms of chlorinated aliphatic hydrocarbons during chlorinolysis to a superatmospheric pressure of at least 4 atmospheres and an elevated temperature above 100° C. in the presence of a catalytic concentration of a catalyst thereby consummating chlorinolysis and obtaining carbon tetrachloride.

15. The method of manufacturing a chlorinated aliphatic hydrocarbon which comprises maintaining a liquid mixture of a cyclic organic compound containing a ring having at least 5 ring atoms, a preponderance of and at least 4 ring carbon atoms, and at least one of said ring carbon atoms being linked only to replaceable substituents which permits the formation from such ring carbon atoms of chlorinated aliphatic hydrocarbons during chlorinolysis and chlorine at a temperature between 400 and 800° C. and at superatmospheric pressure of at least 4 atmospheres, rupturing at least 2 ring linkages in each ring of the cyclic compound and obtaining a chlorinated aliphatic hydrocarbon.

16. The method of claim 15 wherein the temperature is from 425° C. to 550° C.

17. The method of claim 15 wherein the pressure is between 4 and 100 atmospheres.

18. The method of claim 6 wherein the chlorinolysis catalyst is a Lewis acid.

References Cited in the file of this patent

UNITED STATES PATENTS

| | | |
|---|---|---|
| 2,105,377 | Hass et al. | Jan. 18, 1938 |
| 2,168,260 | Heisel et al. | Aug. 1, 1939 |
| 2,299,441 | Vaughan et al. | Oct. 20, 1942 |
| 2,509,160 | McBee et al. | May 23, 1950 |
| 2,650,942 | Maude et al. | Sept. 1, 1953 |
| 2,714,124 | Maude et al. | July 26, 1955 |
| 2,725,406 | Glaser | Nov. 29, 1955 |

FOREIGN PATENTS

| | | |
|---|---|---|
| 672,630 | Great Britain | May 21, 1952 |
| 711,172 | Great Britain | June 23, 1954 |
| 1,058,619 | France | Mar. 17, 1954 |

OTHER REFERENCES

Heuser: "Cellulose Chemistry" (1944), John Wiley & Sons, Inc., p. 450.

UNITED STATES PATENT OFFICE
CERTIFICATE OF CORRECTION

Patent No. 2,854,491                                September 30, 1958

Frederick E. Kung

It is hereby certified that error appears in the printed specification of the above numbered patent requiring correction and that the said Letters Patent should read as corrected below.

Column 2, line 29, for "conversations" read -- conversions --; column 7, line 50, for "appreciateed" read -- appreciated --; column 10, line 10, for "dodecachloroclohexane" read -- dodecachlorocyclohexane --; column 12, line 26, list of references cited, under the heading "UNITED STATES PATENTS" for the patent number "2,105,377" read -- 2,105,733 --.

Signed and sealed this 19th day of May 1959.

(SEAL)
Attest:
KARL H. AXLINE

Attesting Officer

ROBERT C. WATSON
Commissioner of Patents